United States Patent

Thomas et al.

[15] 3,639,057
[45] Feb. 1, 1972

[54] COPYING MACHINE FOR MAKING REDUCED-SIZE COPIES

[72] Inventors: Herbert P. Thomas, Miami; Thomas E. Hartman, Opa Lock; Torulf F. Aasen, Hollywood, all of Fla.

[73] Assignee: Copystatics Manufacturing Corporation, Miami Lakes, Fla.

[22] Filed: Apr. 6, 1970

[21] Appl. No.: 25,794

[52] U.S. Cl. ........................................ 355/51, 355/66
[51] Int. Cl. ........................................... G03b 27/42
[58] Field of Search ........................ 355/8, 47–52, 66

[56] References Cited

UNITED STATES PATENTS

| | | | |
|---|---|---|---|
| 3,059,530 | 10/1962 | Groak | 355/48 |
| 1,976,346 | 10/1934 | Hughey | 355/48 |
| 3,066,572 | 12/1962 | Bubna-Littitz | 355/48 |
| 3,224,328 | 12/1965 | Leistner | 355/50 |
| 3,259,009 | 7/1966 | Walter | 355/50 |
| 3,298,276 | 1/1967 | Bender | 355/51 |
| 3,364,814 | 1/1968 | Iuliu | 355/50 |

Primary Examiner—Joseph F. Peters, Jr.
Assistant Examiner—Richard A. Wintercorn
Attorney—Amster & Rothstein

[57] ABSTRACT

A copying machine for making reduced-size copies. An original document to be copied is moved by rollers past a scanning station faster than a copy sheet is moved past an exposure station. An optical system reduces the size of the image of the original document at the exposure station. The machine is based on another machine originally designed to make full-size copies. In the latter machine, the original document and the copy sheet move at the same speed. To minimize changes in the conversion of the machine, the original transport speed is increased, but movement of the original is interrupted (while the copy sheet continues to move) at some point before the original reaches the scanning station. The machine is also capable of making multiple copies of an original; by slightly decreasing the speed of the original in the reverse direction (relative to the speed in the full-size copying machine), it is not necessary to interrupt movement of the original in the forward direction in all cycles after the first.

16 Claims, 12 Drawing Figures

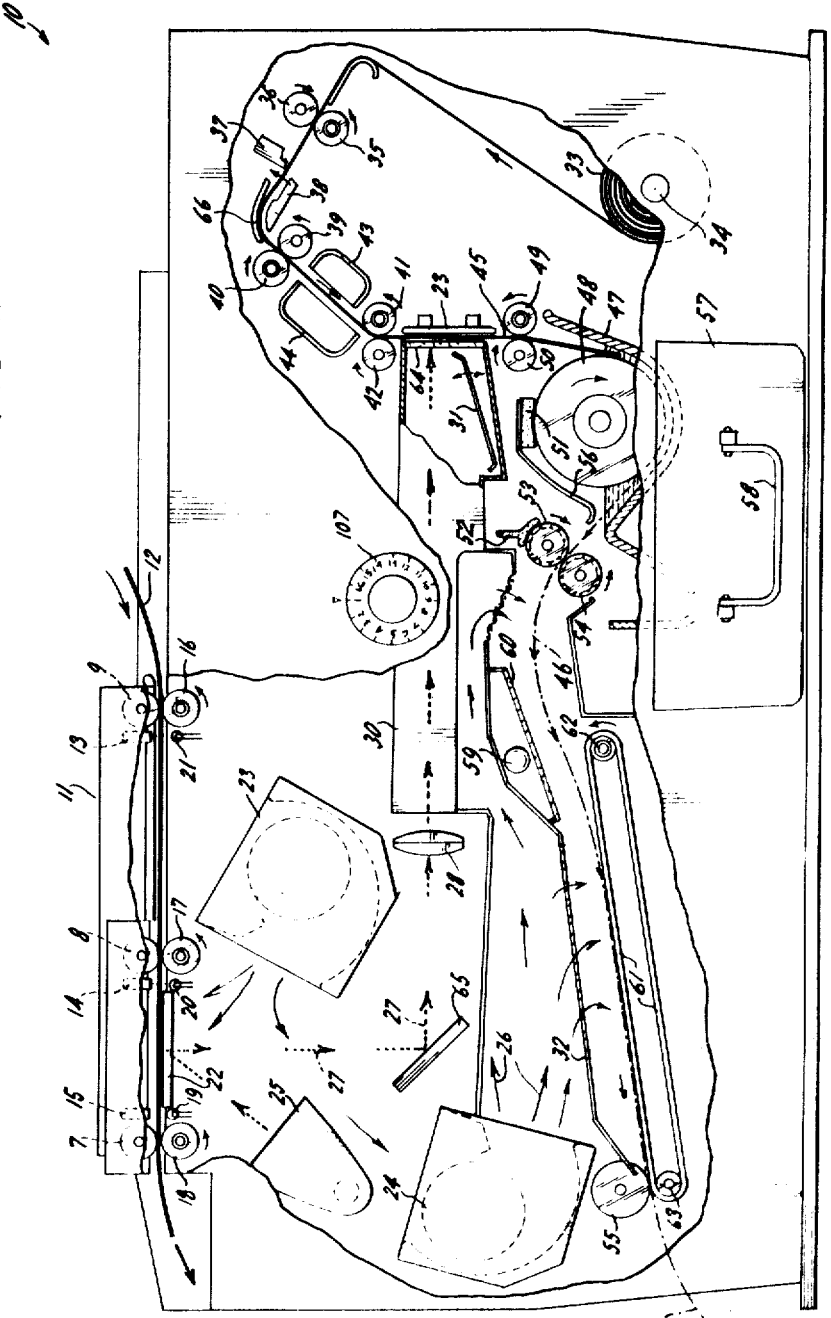
FIG. I.
INVENTORS
JORULF F. AASEN
HERBERT THOMAS
THOMAS HARTMAN
Amster & Rothstein
ATTORNEYS

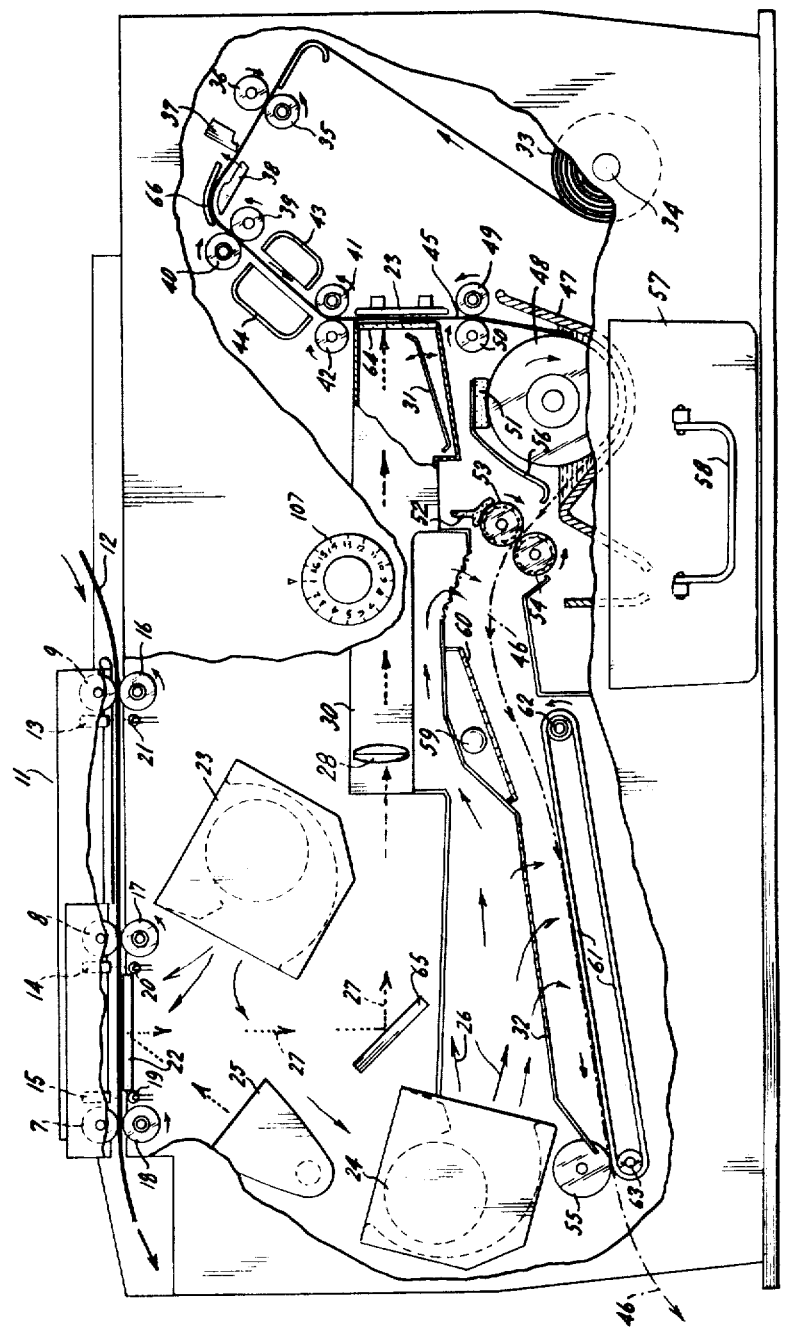
FIG. IA

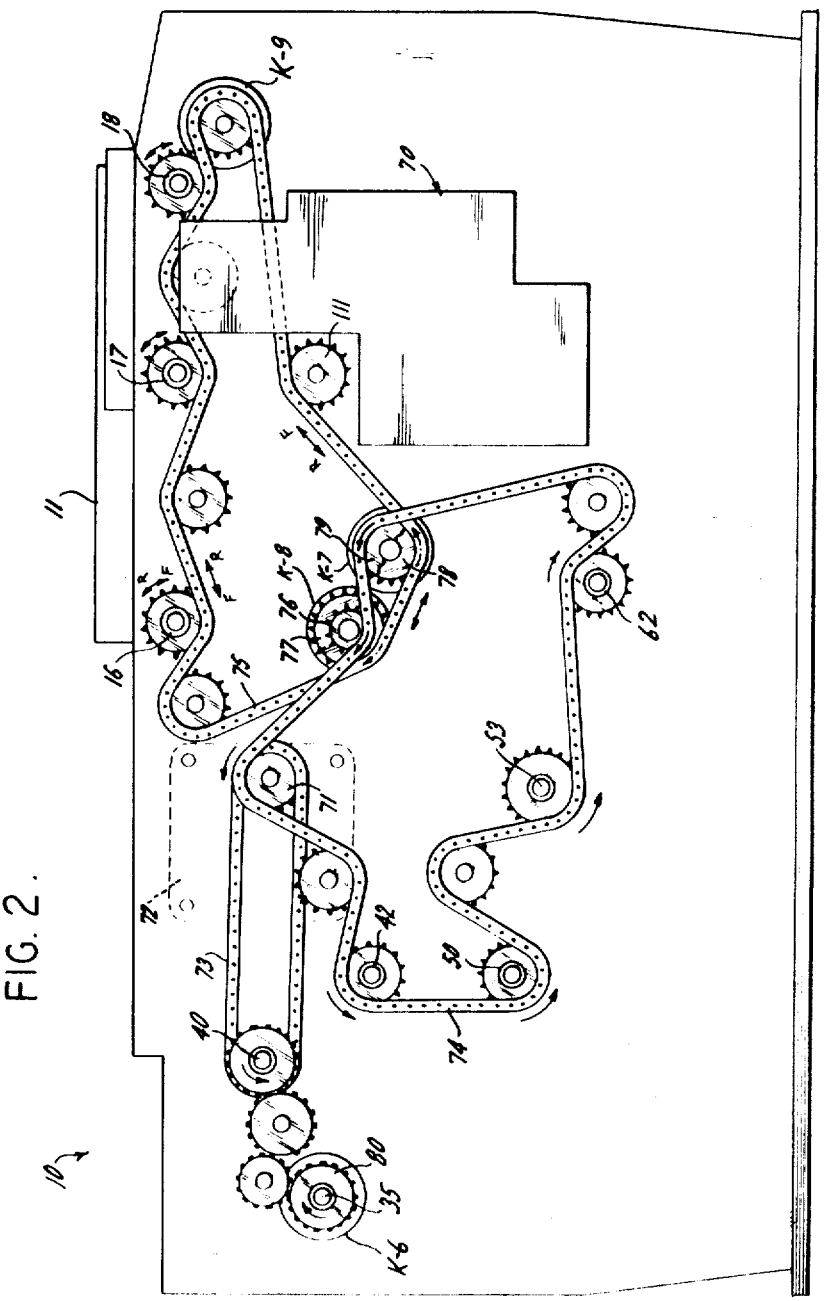

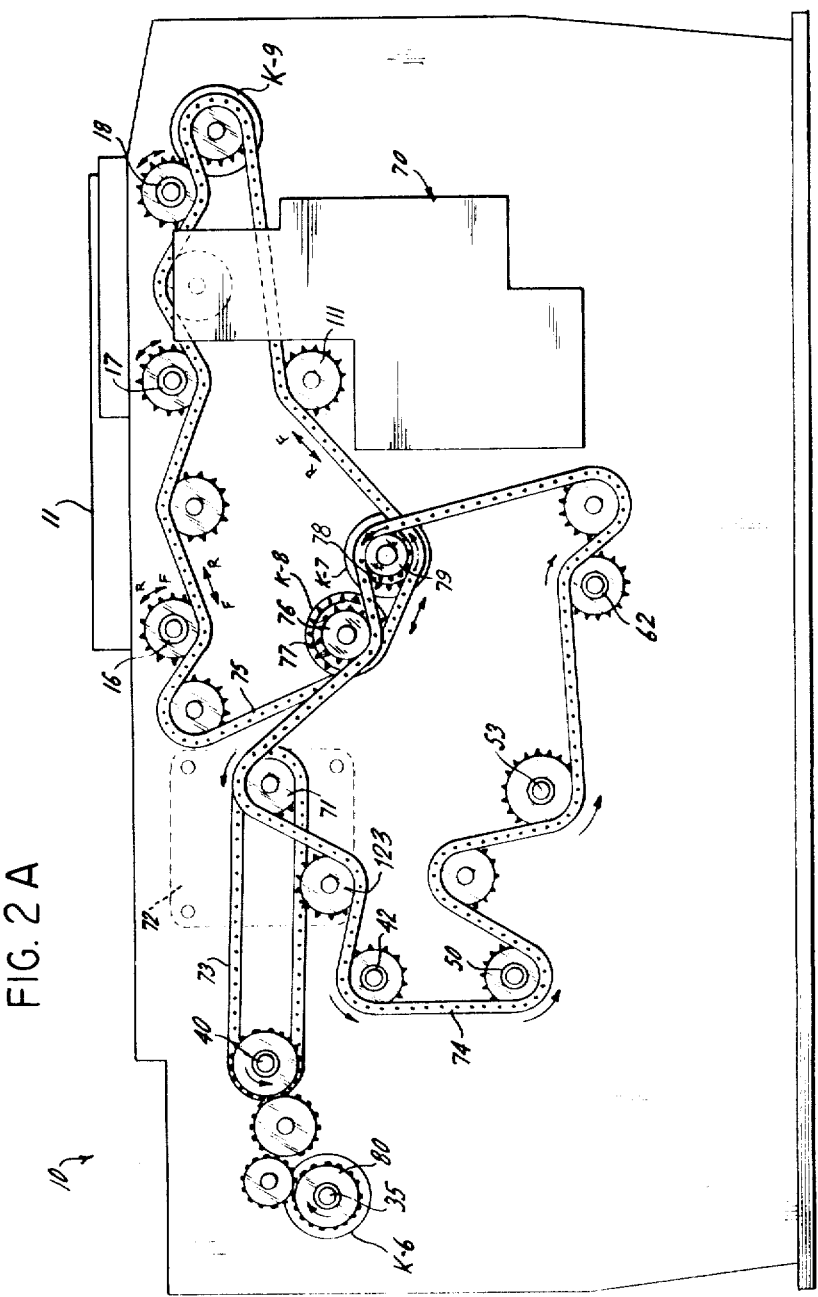

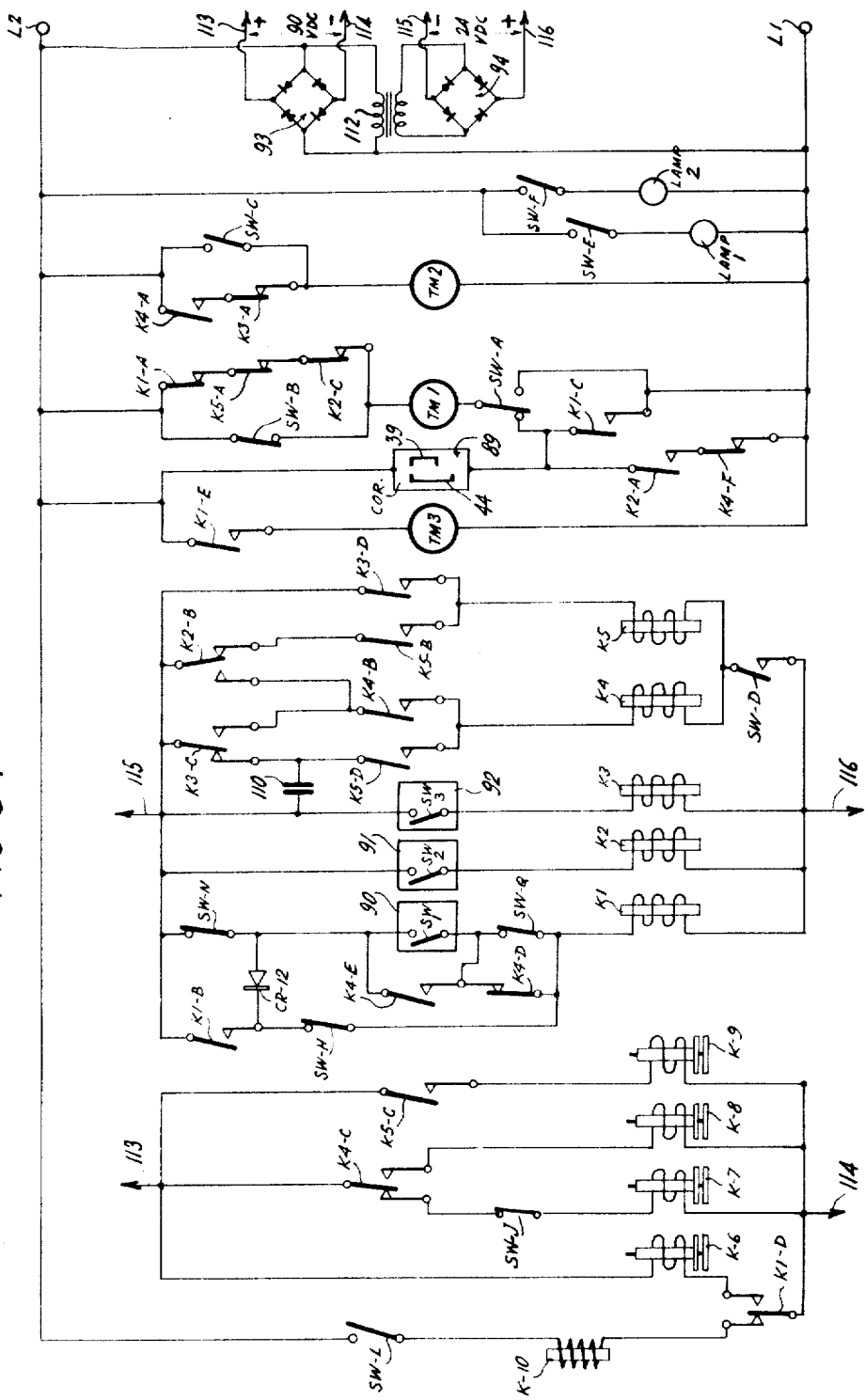

FIG. 4.
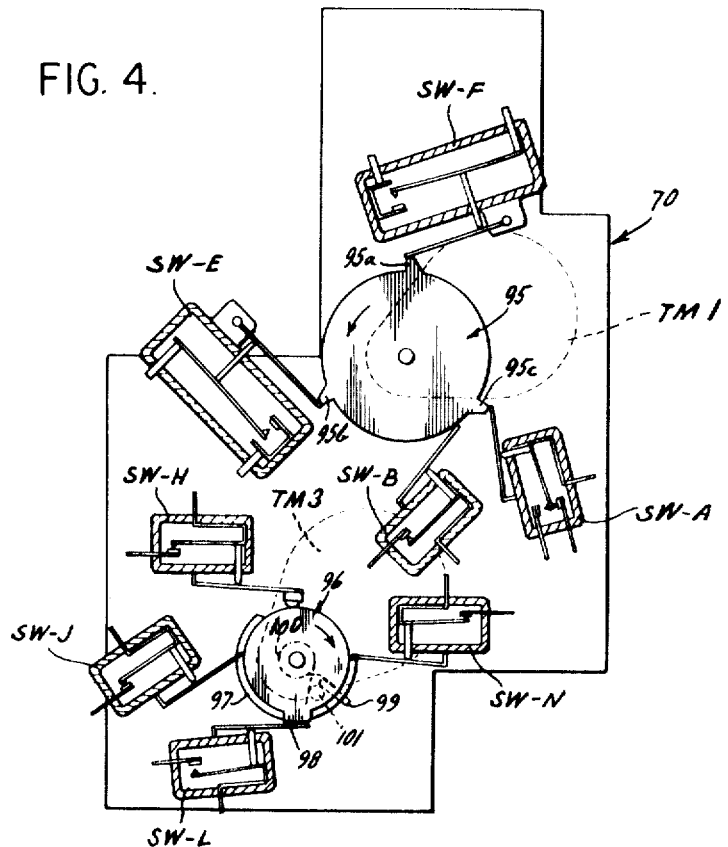
FIG. 6.
FIG. 5.
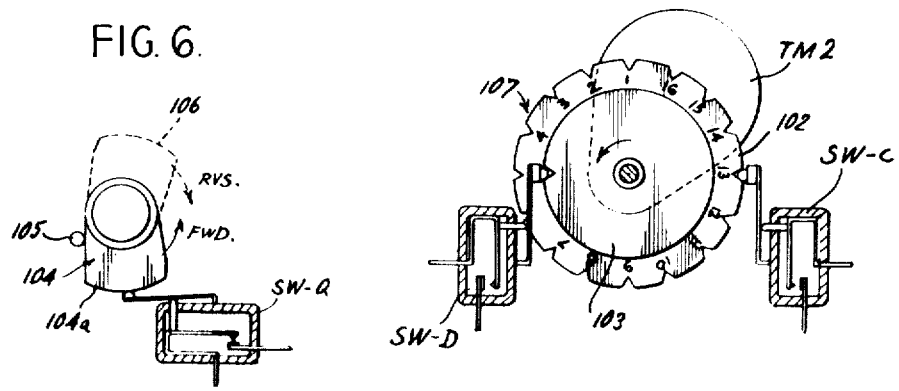

FIG. 4A
FIG. 5A
FIG. 6A
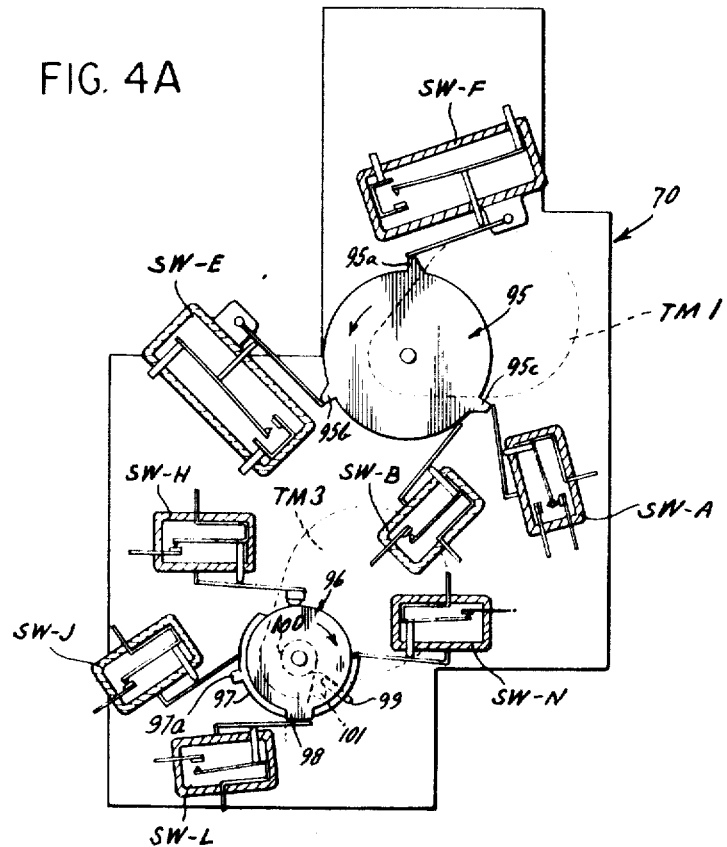
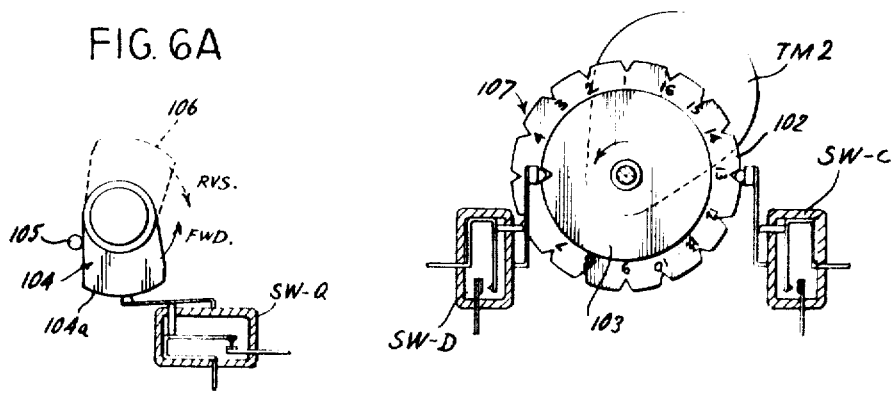

COPYING MACHINE FOR MAKING REDUCED-SIZE COPIES

This invention relates to copying machines, and more particularly to machines for making reduced-size copies.

There are many different kinds of copying machines on the market for making full-size copies of an original document. However, there are many applications in which it is desirable to make copies of reduced size. For example, there are many standard forms which are larger in size than is necessary for storage purposes. By making reduced-size copies, it is possible to save storage space. There is is also a savings in copy paper since less copy paper must be used for each copy.

Of the many different kinds of copying machines, in some the original document to be copied is kept stationary while it is scanned by a moving optical section, and in others the optical section remains stationary while the original document itself is moved. The present invention is directed to machines of the latter type.

It is a general object of our invention to provide a moving original-type copying machine for making reduced-size copies.

In a popular type of machine of the moving original category, the original document to be copied is moved past a scanning window while a copy sheet is moved past an exposure window. The to sheets move at the same speed with the original being scanned and the copy sheet being exposed continuously. If the copy is to have the same size as the original, the copy sheet must move past the exposure window at the same speed that the original moves past the scanning window.

Whether the copy sheets are derived from a stack of cut sheets or are cut from a roll, the forward edge of the copy sheet always begins moving from the same point in the machine after an original document is fed in. Typically, the point from which the forward edge of the copy sheet begins moving is at a distance in front of the optical axis intersection with the exposure window which is the same as the distance between the optical axis intersection with the scanning window and the point in the original transport system which is reached by the original document when the copy sheet feed begins. In this manner, the leading edges of the original and copy sheet are in "optical synchronization" with each other.

Considerable effort goes into setting up a production line for any particular copying machine. It would appear tat for a particular manufacturer to produce both a "full-size" copying machine and a "reduced-size" copying machine, two separate production lines would have to be set up. This is due to the fact that to make a reduced-size copy, the copy sheet must be moved at a slower speed for optical synchronization to be maintained. It would thus appear that the starting point of the feed of each copy sheet could not be the same as it is in a similar machine designed to make full-size copies. Since the starting points cannot be the same, it is apparent that in a machine in which copy sheets are cut off from a supply roll, the position of the knife in the reduced-size copying machine must be different from the position of the knife in the full-size copying machine. If this process of making changes in the original (full-size) machine is followed in designing a machine for making reduced-size copies, it would appear that a point is soon reached where so many changes are required that for all practical purposes it is not feasible to make both machines on the same assembly line.

It is another object of our invention to modify a machine for making full-size copies by making a minimum number of changes to achieve a machine for making reduced-size copies.

The techniques for modifying a machine designed for full-size copying in order to achieve a machine for reduced-size copying are described with reference to the copying machine disclosed in Van Auken et al. application Ser. No. 725,390, filed on Apr. 30, 1968. The machine disclosed in that application is unique in that multiple copies of an original document can be made at a very fast rate. This is achieved by shuttling the original document back and forth past the scanning window. As soon as the original passes the scanning window, it is moved in the reverse direction until its leading edge just clears the forward edge of the scanning window. At this time the original moves once again in the forward direction. While the original is moving in the reverse direction, the copy sheet feed is begun. In this way, at the same time that the original clears the scanning window in the reverse direction, the copy sheet reaches the exposure window; all that is required at this time is for the original to start moving once again in the forward direction. This sequence of original forward and reverse movements, and early start of copy sheet feed, would appear to further complicate the conversion of a machine capable of making full-size copies to a machine capable of making reduced-size copies. However, in accordance with the principles of our invention, a minimum number of changes are required even in the Van Auken et al. copying machine to arrive at a machine capable of making multiple reduced-size copies.

In accordance with the principles of our invention, a reduced-size image is obtained simply by changing a single lens in the optical system of the machine. The lens has a shorter focal length and is moved closer to the exposure window. The size of the image is reduced by 25 percent. The copy paper must move at the speed of the image, and consequently the copy paper must move at only 75 percent of the speed at which the original moves. In the illustrative embodiment of our invention, the speed differential is achieved by increasing the speed of the forward transport system. Each copy sheet starts from the same point at which it starts in the Van Auken et al. machine. Consequently, it would appear that the original document would be far ahead of the copy sheet and optical synchronization would be lost. For this reason, we provide a microswitch operated from a cam which rotates during each copying cycle. When the microswitch is operated, the rollers which move the original document in the forward direction come to a halt. The interruption in the forward feed of the original has a duration sufficient to allow the copy sheet to catch up to the original document such that they are placed in optical synchronization before exposure of the copy sheet begins.

When the machine is used to make multiple reduced-size copies of an original, the original moves in the reverse direction past the scanning window at the end of each copying cycle rather than being ejected from the machine. In the Van Auken et al. copying machine, the original moves at an increased speed in the reverse direction, and the copy paper feed begins while the original is moving in the reverse direction. In the illustrative embodiment of our invention, for a reason to be described below, a gear ratio is changed so that the original moves at a slightly slower speed in the reverse Direction than it does in the Van Auken et al. machine (although the reverse speed is still faster than the overall average forward speed). Also, it is unnecessary to interrupt the movement of the original document in the forward direction in all cycles after the first.

It is a feature of our invention to provide a reduced-size copying capability in a copying machine in which an original document is moved by rollers past a scanning window by providing an optical system which produces a reduced-size image at the exposure window, and by moving the original document past the scanning window at a rate faster than the rate at which a copy sheet is moved past the exposure window.

It is another feature of our invention to provide a reduced-size copying capability for a machine designed for full-size copying by interrupting the movement of an original document in the forward direction before it is scanned at the scanning window.

It is another feature of our invention to provide a reduced-size copying capability in a machine designed for multiple full-size copying and in which the original is shuttled back and forth by slightly decreasing the speed of the original in the reverse direction past the scanning window.

Further objects, features and advantages of our invention will become apparent upon consideration of the following detailed description in conjunction with the drawing, in which:

FIGS. 1-6 are identical to the same-numbered figures in the above-identified Van Auken et al. application, where FIG. 1 depicts schematically (partially broken away) the arrangement of various mechanisms in the copying machine 10;

FIG. 2 is a view, with the housing removed, of the other side of the copying machine of FIG. 1, showing the various drive chains for moving the original and copy sheets;

Figure 3:
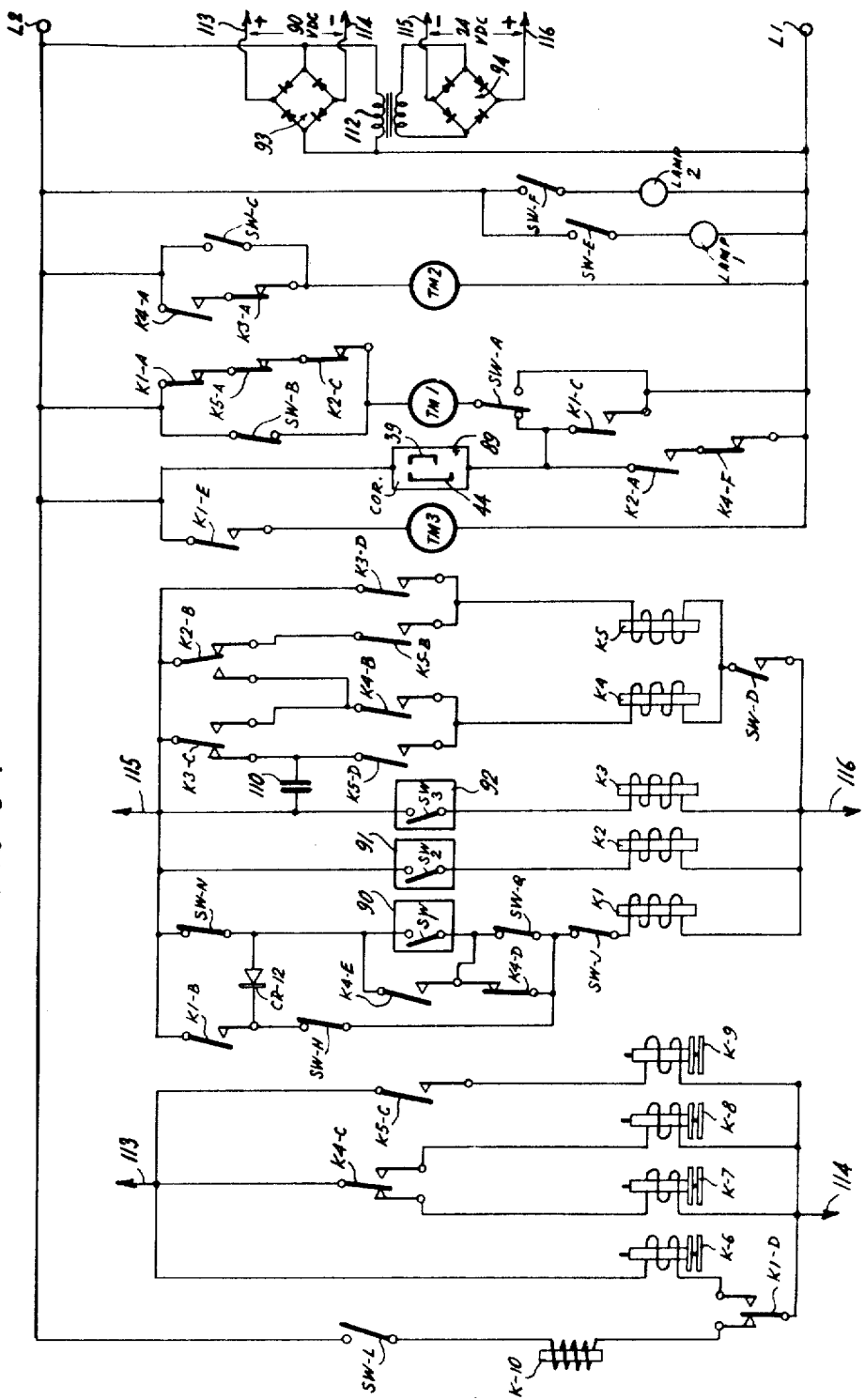

FIG. 3 is a schematic diagram illustrating a control circuit for governing the operation of the machine of FIGS. 1 and 2 in accordance with the principles of the invention; and FIGS. 4, 5 and 6 depict the arrangement of various cams and switches used in the system of FIGS. 1-3; and FIGS. 1A-6A depict the changes required in the copying machine of FIGS. 1-6 to achieve a reduced-size copying capability. (FIGS. 5A and 6A are identical to FIGS. 5 and 6; the only changes required in the Van Auken et al. machine are those shown on FIGS. 1A-4A.)

GENERAL DESCRIPTION OF VAN AUKEN ET AL. MACHINE OPERATION (FIGS. 1-6)

The copy paper used in the illustrative embodiment of the invention is electrophotographic in nature. It has the ability to retain an electric charge placed on its photoconductive coating by an electrostatic field. The coating can be discharged by the application of light. Typically, copy paper roll 33 (FIG. 1) consists of a base paper with photoconductive zinc oxide particles dispersed in a resin coating. An electrical charge is placed on the front and back surfaces of the zinc oxide coating. When light strikes the zinc oxide particles they become conductive and the charged surfaces are neutralized.

As the leading edge of copy paper roll 33 passes through rollers 35, 36, 39, 40 and 41, 42, the paper passes through the corona shields 43, 44 which house two sets of very fine wire elements (not shown) across which is placed a high DC voltage supply. The negative wire elements are contained within shield 44 while the positive wire elements are contained within shield 43. The shields aid in establishing the corona field.

As the copy paper passes through the two sets of oppositely charged wire elements, a uniform negative charge is applied to the photoconductive coating on the surface facing shield 44. A uniform positive charge is placed on the surface of the coating facing shield 43. The charges placed on the surfaces of the copy paper will be retained for a reasonable length of time provided it is not exposed to any light. When light strikes the photoconductive coating, the zinc oxide particles which are exposed become conductive, neutralizing the negative and positive charges in the exposed areas.

As the copy paper passes the exposure window consisting of a glassless window strung with monofilament 64 and pressure member 23, the photoconductive coating is exposed in accordance with dark and light areas on the original to be copied. Rotary knife 38 cuts a copy sheet from the roll such that the cut sheet is the same length as the original to be copied. When knife 38 operates, the copy roll paper feed stops, although the cut copy sheet continues to move past the exposure window to trough 47 in the developing section of the machine.

The original document 12 is fed into the machine between rollers 9, 16 which turn to move the original in the direction shown (from the right end of the machine in FIG. 1 to the left end). the original passes the scanning window, on top of glass plate 22, light from two exposure lamps (shown in phantom in FIG. 1) within reflector 25 is reflected from the light image areas on the original along the dotted arrows 27 as shown. The light passes through lens system 28, assembly 30 and window 64 to expose the copy paper. The copy paper feed is controlled such that the leading edge of the copy sheet within the exposure window is in optical synchronization with the leading edge of the original within the scanning window. The copy paper retains a negative charge in those areas corresponding to dark (image) areas on the original. The nonimage areas on the original reflect a great deal of light to the surface of the copy paper causing the neutralization of the charged areas corresponding to the nonimage areas on the original.

The copy sheet is then fed to trough 47. As shown in the drawing, the forward end of the copy paper has just entered the trough. The copy sheet continues to travel along path 46 until the copy sheet is ejected from the machine. In trough 47 there is a developer solution conSisting of charged toner particles which are attracted to the negatively charged image areas on the copy paper. The attracted toner particles are impregnated and fixed to the copy paper coating by a system of squeegee rollers and forced hot air drying.

The machine includes two basic systems of feed rollers or paper transport rollers, shown in FIG. 2 and to be discussed below. One system is kept constantly rotating by a series of sprockets and drive chains, while the second system is clutch controlled so that it operates only when one of two clutches is engaged.

When original document 12 is inserted between pickup rollers 9, 16 the original is transported to the left in FIG. 1. As the leading edge of the original emerges from roller 9, 16, it actuates photocell switch 13. Each of photocell switches 13, 14, 15 is provided with a respective light source 21, 20, 19. When the leading edge of the original passes between a light source and its respective photocell switch, the change in state is registered and used to control the machine operation. When switch 13 first operates, copy paper roller clutch K-6 (FIGS. 2 and 3) is energized to control copy paper insert rollers 35, 36 to rotate. These rollers pull the forward edge of the copy roll to direct the copy paper through the corona unit. The other rollers along the copy paper path continuously operate. Initially, the forward edge of the copy paper is adjacent to knives 37, 38. Thus, although the rollers following the knives along the copy paper path rotate continuously there is no copy sheet to be transported through the machine. But once rollers 35, 36 start operating, copy paper is drawn from the roll into the copy paper transport system. The corona unit within shields 43, 44 charges the surfaces of the copy paper. The original and the copy paper are synchronized in their movements. The distance along the copy paper path from the two knives to the intersection of the optical axis with the exposure window equals the distance from photocell switch 13 to the intersection of the optical axis with the scanning window. Since the rollers along the original and copy paths move the original and the copy paper at the same speed, and since the copy paper starts to move past the knives under control of rollers 35, 36 just when the forward edge of the original is adjacent photocell switch 13, it is seen that the original and copy paper are in optical synchronization with each other during the scanning process.

As the trailing edge of the original passes photocell switch 13, the copy paper roller clutch K-6 is disengaged. Rollers 35, 36 stop turning and copy roll 33 remains stationary. At the same time knife solenoid K-10 (FIG. 3) is energized to cause rotary knife 38 to cut the copy paper to the exact length of the original. The cut sheet continues to be transported by the copy paper transport system through developer trough 47. Intensifier drum 48 is constantly turned in the direction shown. (It is possible to turn it in the opposite direction, and at various speeds as well.) This insures that the copy paper is guided through the developing trough. The developer solution itself is contained in tank 57 which can be pulled out of the machine by handle 58. A pumping system (not shown) pumps the developer upward into trough 47.

The copy sheet then passes under deflector 56 toward the nip of squeegee rollers 53, 54. The squeegee rollers remove the excess liquid dispersant from the copy paper and to some slight degree also imbed the attracted toner particles into the zinc oxide coated surface of the copy paper. Wiper 52 wipes metal squeegee roller 53 to prevent "tracking back" or offsetting of a previous image, just as wiper 51 wipes intensifier drum 48. The copy sheet is then forced down by the circulating air under drier lamp 59 onto belt 61 which moves continuously around rollers 62, 63, roller 62 being turned by the constantly rotating chain drive. The copy sheet is finally passed between belt 61 and plastic idler rollers 55, several of which may be included on the same shaft. These rollers slightly crease the copy paper so that it will stack properly in the copy receiving tray (not shown).

Blowers 23, 24 force air (shown by arrows 26) through the machine as is well known in the art, for example, to dissipate the heat generated by the exposure lamps. A series of guides 32 are provided for properly directing the air.

Shutter 31 can be moved up and down from outside the machine (not shown); the lower the right end of the shutter, the larger the shutter opening and the greater the exposure. The units shown symbolically on FIG. 1 are generally of types well known in the art and for the purposes of the present invention need not be gone into in any greater detail. A machine constructed in accordance with the principles of our invention includes many mechanisms, controls and indicators, not shown in the drawing. For example, various indicator lights may be provided to notify the operator when additional developer solution is required or when a new roll of copy paper must be placed in the machine. The only control shown in the drawing is that required for an understanding of the present invention, namely, the multiple copy selector dial 107 shown in FIGS. 1 and 5. This dial is marked in equal graduations numerically representing the number of copies desired. The selector dial can be reset at any time during machine operation providing for maximum flexibility. If the selector dial is allowed to remain in the normal position (single copy mode) shown in FIG. 5, the machine will produce only one copy for each original inserted into it. Any other position will provide the number of copies as indicated by the selector dial setting.

In the multiple copy mode, during the first cycle the original is scanned in the usual manner. Before it has travelled far enough to be released by the last set of rollers 7, 18, the trailing edge of the original actuated photocell switch 15. This causes the original transport roller system to reverse and return the original, at a speed greater than the forward speed, to the right toward the normal insertion point. When the leading edge of the original clears photocell 14, the original transport roller system is again normalized and transports the original to the left past the scanning window where it is scanned a second time (All references herein to leading and trailing edges of the original are made respectively to the left edge of the original and the right edge of the original in FIG. 1. Thus, even when the original is being transported in the reverse direction, the leading edge is still considered to be the leftmost edge in FIG. 1.) This procedure is repeated until the multiple copy selector dial 107 is "counted down" to the normal single copy mode position. The dial is decremented one position during each reverse travel of the original. When all copies have been made except the last, the selector dial is fully decremented to the single copy mode position, at which time the machine will produce one more copy and deposit the original in the original receiving tray.

To speed up the multiple copy operation, the original is returned only so far as to allow its leading edge to be adjacent to the forward end of the scanning window. Since the original immediately starts its forward movement, it is necessary for the leading edge of the copy sheet to be at the forward end of the exposure window by this time, i.e., the copy feed must start while the original is still being moved in the reverse direction. In the single copy mode, the copy feed starts when photocell 13 detects the leading edge of the original. But in the multiple copy mode, except during the first forward feed of the original, the leading edge of the original does not pass photocell 13. For this reason an alternate mechanism must be provided for initiating the copy feed during reverse movement of the original.

Cam 106 (FIG. 6) is clutched to the original forward feed system when the leading edge of the original passes photocell switch 15. The cam rotates counterclockwise as the original continues in the forward direction. When the original starts to move in the reverse direction, cam 106 starts restoring in the clockwise direction. The cam is fully restored when the leading edge of the original passes photocell 15 in the reverse direction. But during the clockwise movement of cam 106, some time prior to its full restoration, switch SW–Q is operated. The operation of the switch starts the copy paper feed. The leading edge of the original must yet travel back past photocell 15 (switch SW–Q operates while the leading edge of the original is still to the left of photocell 15 in FIG. 1) and the scanning window to photocell 14. The leading edge of the copy paper must travel from the knives to the forward end of the exposure window during the same time interval. The original reverse feed rate is greater than the copy feed rate. To assure proper registration of the original and copy at the scanning and exposure windows it is only necessary to have cam 106 operate switch SW–Q at a point during the reverse movement of the original where the ratio of the distance of the leading edge of the original from photocell 14 to the distance between the knives and the exposure window is equal to the ratio of the original reverse feed rate to the copy feed rate. In this way the leading edge of the original will reach photocell 14 just when the leading edge of the copy sheet reaches the exposure window.

As soon as photocell 14 detects the leading edge of the original, the original starts moving in the forward direction at the same speed as the copy paper is moving. It is still necessary to cut the copy sheet. This is easily accomplished. The positions of the original and copy paper are the same as though the machine were operating in the single copy mode. Consequently, when photocell 13 detects the trailing edge of the original, it actuates the cutting mechanism and inhibits further feed from the copy paper roll. The length of the cut copy sheet during each cycle in the multiple copy mode is thus the same as that of the original.

GENERAL DESCRIPTION OF VAN AUKEN ET AL. ORIGINAL AND COPY TRANSPORT SYSTEMS (FIGS. 1 AND 2)

Referring to FIG. 2, when the main drive motor 72 is energized by the system on-off switch (not shown) it rotates main drive sprockets 71 counterclockwise. Main drive chain 74 is driven in a counterclockwise direction by sprockets 71. This chain turns various sprockets, including tension adjustment idler sprocket 123 and the sprockets coupled to rollers 42, 50, 53 and 62. These four rollers turn continuously to move the copy paper. The fifth roller which is continuously turned in the path of the copy paper is roller 40, coupled to a sprocket driven by drive chain 73. Chain 73, like chain 74, is driven by sprockets 71 as long as the main power switch is energized. Chain 74 drives sprocket 79 in the counterclockwise direction and drives sprocket 76 in the clockwise direction. Sprocket 76 rotates at a greater speed than that of sprocket 79 because of its smaller diameter.

Chain 75 is the original transport drive chain. It is driven indirectly by main drive chain 74 through an electrical clutch system. When forward clutch K–7 (to be described in connection with FIG. 3) is energized, sprockets 78 and 79 are clutched together and sprocket 78 moves with continuously rotating sprocket 79. Drive chain 75 moves in the forward (F) direction, and since the diameter of sprockets 78 and 79 are the same, chain 75 moves at the same speed as chain 74. Since the transport rollers have the same diameters, the original and copy sheets move through the machine at the same speed. Chain 75, in addition to moving over a tension adjustment idler sprocket 111, drives the three sprockets coupled to rollers 16, 17 and 18. Referring to FIG. 1, these are the three driven rollers in the original transport system.

During multiple copying the original is first transported in a forward direction to be scanned and is then returned in the reverse direction at high speed. This forward and reversing process continues as long as the machine remains in the multiple copy mode. When the original is being returned, forward clutch K–7 is deenergized and sprocket 78 is no longer coupled to sprocket 79. At the same time reverse clutch K–8 (to be described in connection with FIG. 3) is energized, which engages reverse sprocket 77 with sprocket 76. Since sprocket 76 moves at a faster rate than sprocket 79, and sprocket 77 when clutched to sprocket 76 moves at its rate, chain 75 moves in the reverse (R) direction at a greater speed than it does in the forward direction. With chain 75 moving clockwise, rollers 16, 17 and 18 move in the reverse direction (opposite to that shown in FIG. 1) to return the leading edge of the original to the forward end of the scanning window. When this point is reached, the control circuits again change the driving direction of chain 75 by deenergizing reverse clutch K-8 and energizing forward clutch K-7.

Although chain 73 continuously drives the sprocket coupled to roller 40, as well as the three gears following it and terminating in gear 80, roller 35 does not rotate continuously. This is the roller which starts the copy paper feed. Only when clutch K-6 is operated is roller 35 coupled to gear 80. At this time copy paper feed begins.

The drive system is shown only schematically in FIG. 2, since the basic elements of such a drive system are well known. For example, it is understood that chain 74 can be used to drive any other elements which must be driven in the machine. The important thing to note in FIG. 2 is the use of three clutches in connection with sprocket pairs 78, 79 and 76, 77, and gear 80. The first clutch controls the forward movement of the original document. The second clutch controls the reverse movement of the original document at a faster speed. The third clutch controls copy paper feed.

In the original transport system, rollers 16, 9 serve as the original input rollers, rollers 17, 8 serve as the scanner input rollers, and rollers 18, 7 serve as the original exit rollers. As described above, rollers 16, 17 and 18 are driven by chain 75 in either direction. Rollers 7, 8 and 9 are contained in bridge assembly 11 and are in friction contact with their respective lower rollers when bridge 11 is placed on the machine. The bridge is removable so that in the event of an original jam, it can be corrected with little difficulty. Photocell switches 13, 14 and 15 contained in bridge 11 are connected to the rest of the machine by contacts on bridge 11. The bridge also includes a pressure plate (not shown) for bearing against the original on top of scanning glass 22. The spacing between the pressure plate and scanning glass 22 is several paper thicknesses.

An original collecting tray (not shown) is provided at the left end of the machine of FIG. 1 for collecting successive originals as they are fed through the machine. During multiple copying, the original is scanned in the forward direction in the usual manner, but before it is released by exit rollers 7, 18, all three pairs of transport rollers are automatically reversed and the original is returned at high speed in the reverse direction. The control circuit (FIG. 3) to be described below prevents a copy from being made while the original is being reversed. The original continues to be transported in the reverse direction until the leading edge is to the right of scanning window 22 at which time the control circuit again causes the original to be transported in the forward direction to be scanned again. Photocells 14 and 15 are disposed at each end of the scanning glass and serve various functions to be described below. Photocell 13 serves to control the length of the cut copy sheet as well as the copy paper feed.

Copy paper roll 33 is mounted on copy paper roll shaft 34. Although not shown, as is known in the art, provision is made for placing new copy paper rolls on the shaft as they are used up.

The operations of the original transport system during the single and multiple copy modes are considerably different. However, with respect to the copy transport system the operation is the same. Rollers 35, 36 and knife 38 control successive feedings of copy sheets into the copy transport system. The multiple copying mode operation will be described in detail below after the control circuit of FIG. 3 is first described with respect to single mode operation.

DETAILED DESCRIPTION OF VAN AUKEN ET AL. SINGLE COPY OPERATION (FIGS. 1-6)

Referring to FIG. 3, three switches, SW1, SW2 and SW3, are shown enclosed in three boxes 90, 91 and 92. These switches are symbolic of the three photocells 13, 14 and 15 and their associated amplifier circuitry in the original transport system. SW1 corresponds to photocell 13, SW2 corresponds to photocell 14 and SW3 corresponds to photocell 15. Each switch is normally open but closes when the original passes under the respective photocell and blocks light from the respective one of light sources 19, 20 and 21. The switches are shown only symbolically since the construction of such switches are well known to those skilled in the art.

Before proceeding with a description of the operation of the control circuit shown on FIGS. 3-6, it is necessary to set forth the meaning of the various notations used on the drawing. On FIG. 3 there are five relays K1 through K5. Each of these relays is normally deenergized. Each relay has a number of contacts, A, B, etc. For example, contact K3-D is the fourth movable contact on relay K3. All of the contacts are shown in FIG. 3 in their normal positions with all five relays deenergized.

On FIG. 3 there are also four clutches K-6 through K-9. Clutch K-6 is the paper roller clutch which when energized causes copy paper rollers 35 and 36 to operate. Clutch K-6 is shown on FIG. 2 as controlling rotation of roller 35. Clutch K-7 controls forward feed of the original, and when energized causes rollers 16, 17 and 18 to rotate in the directions shown in FIG. 1. Clutch K-8 is the reverse clutch which when energized controls the reverse movement of the original. As seen in FIG. 3, contact K4-C controls the energization of either clutch K-7 or clutch K-8. Finally, clutch K-9 when energized controls movement of cam 104 of FIG. 6 in synchronism with original drive chain 75 (FIG. 2). This clutch is operated only during multiple copying.

K-10 is the solenoid which when energized operates rotary knife 38 to cut the copy paper.

On FIG. 3 there are also three timing motors TM1, TM2 and TM3. When energized, these motors control movements of respective cams 95 (FIG. 4), 102 and 103 (which comprise selector dial 107—FIG. 5), and 96 (FIG. 4). These three cams, as well as cam 104 (FIG. 6), actuate various switches SW-A, SW-B, etc. Except for SW-A, each switch has two terminals. With the cams in their normal positions as shown in FIGS. 4-6, some of the switches are open and some are closed. Switch SW-J, for example, is closed, and as shown in FIG. 3 a connection is made through the two terminals of this switch to the winding of relay K1. Others of the switches such as SW-L are open. As will be described below, rotations of the various cams control the opening of the normally closed switches, and the closing of the normally open switches. Switch SW-A, unlike the others, has three contacts as shown in FIG. 4, and as similarly shown in FIG. 3 in the circuit of timing motor TM1. In the rest position as shown in FIG. 4, SW-A is deactuated with a slight rotation of cam 95, the contact connections reverse and timing motor TM1 is connected to terminal L1 in FIG. 3, bypassing contact K1-C.

As shown on the right side of FIG. 3, two rectifiers 93, 94 and a transformer 112 are provided for deriving two DC potentials, 24 volts and 90 volts, across conductors 113-116. The various clutches and relays on FIG. 3 are connected between these DC potentials, while the three timing motors are connected across the AC line terminals L1 and L2.

When the leading edge of the original actuates switch SW1, the energizing circuit for relay K1 is completed through normally closed switch SW-N, switch SW1, normally closed switch SW-Q, and normally closed switch SW-J. Closed contact K4-D bypasses switch SW-Q and part of the energizing current for relay K1 flows through this contact. With the energization of relay K1 the copy paper roller clutch K-6 is operated, current flowing through the winding of the clutch and the now closed K1-D transfer contact. The corona charging system including a high-voltage rectifier (shown symbolically by numeral 89) is also energized through the now closed K1-C contact, this contact connecting the corona charging circuit to line terminal L1.

At the same time, timing motor TM1 starts operating with the closing of the K1-C contact. The motor circuit is completed from terminal L1 through the K1-C contact, switch SW-A, and normally closed switch SW-B connected to line terminal L2. Although switch SW-B is bypassed by contacts K1-A, K5-A and K2-C, current does not flow through these contacts because contact K1-A is open. The operation of motor TM1 starts the turning of cam 95 on FIG. 4. The cam turns counterclockwise and as soon as lobes 95a, 95b move slightly, switches SW-E and SW-F close. Each of these switches is connected in the energizing circuit for one of the two exposure lamps (FIG. 3). In the illustrative embodiment of the invention two such lamps are included in reflector 25 (FIG. 1). Motor TM1 and cam 95 are provided to insure that the exposure lamps remain on for not less than 5 seconds. This is necessary since the lamps have a tendency to darken on shorter duty cycles. As will become apparent below, cam 95 turns 120° during each copying cycle. If timing motor TM1 is not interrupted, the cam turns this amount within 5 seconds. In the case of long originals, however, the timing motor is interrupted so that the lamps remain energized even longer.

As soon as lobe 95c moves slightly, switch SW-A changes position such that the energizing circuit for timing motor TM1 bypasses contact K1-C. Thus, even after relay K1 releases, the timing motor can still operate. The motor continues to run until lobe 95b opens switch SW-B. Unless relays K1 and K2 are released at this time and contacts K1-A and K2-C are closed, the energizing circuit for TM1 is broken.

With the closing of contact K1-E, timing motor TM3 starts operating. This motor insures a cut copy length of not less than 8 inches and not more than 20 inches. Provided that the length of the original is within these two limits the actual length of the cut copy will be identical with that of the original. Otherwise, a minimum length of 8 inches or a maximum of 20 inches is cut. The 8-inch minimum is to insure that the cut copy sheet has a sufficient length so as to at all times be driven by rollers in the copy transport section. Otherwise, if the cut copy is too short it may be trapped in the machine. The 20-inch maximum is to insure that the copy sheet will not jam in the machine.

Cam 96 has two separate camming surfaces 97 and 98. Switches SW-H and SW-N are controlled by the lower camming surface 97. Switches SW-J and SW-L are controlled by the upper camming surface 98. The lower camming surface 97 extends more than halfway around cam 96, while camming surface 98 extends only a fraction of the way around. With the energization of timing motor TM3 by the closing of contact K1-E, cam 96 starts to turn and switch SW-N opens. Although the original energizing current for relay K1 flowed through this contact, the relay remains energized because contact K1-B is now closed and current flows through it and contact SW-H. Even after switch SW-N opens, diode CR-12 remains nonconducting because it is shorted by the low resistance path through switch SW-H. However, with the opening of switch SW-H, current flows through closed contact K1-B and the diode, and through switch SW1, the parallel circuit including switch SW-Q and contact K4-D, and switch SW-J.

The purpose of this circuit is to insure the minimum copy length of 8 inches. By the time camming surface 97 turns sufficiently to open switch SW-H, at least 8 inches of copy paper have been fed into the copy transport system. Relay K1 cannot release before this minimum feed has occurred, and since knife solenoid K-10 cannot operate until relay K1 releases, the minimum length cut copy sheet is 8 inches. Only after switch SW-H opens does diode CR-12 conduct, and only then does the opening of switch SW1 control the knife operation.

As soon as cam 96 starts to rotate, camming surface 98 allows switch SW-L to close. Although this switch is in the energizing circuit for knife solenoid K-10, the knife solenoid does not operate because transfer contact K1-D is no longer connected in the circuit.

Relay K1 remains energized until the trailing edge of the original clears switch SW1 (assuming that switch SW-H has by this time opened). Contact K1-D restores to the position shown in FIG. 3, clutch K-6 releases, rollers 35, 36 stop turning, and no more copy paper is fed from roll 33. Similarly, the return of contact K1-D completes the energizing circuit for knife solenoid K-10, switch SW-L having closed as soon as cam 96 started to turn. Rotary knife 38 rotates in the counterclockwise direction and the copy sheet is cut from the copy paper roll.

Since contact K1-D completes the energizing circuit for both copy paper clutch K-6 and knife solenoid K-10, the paper roll feed stops slightly prior to the operation of the knife. This could present serious difficulty (the copy paper transport system would continue to draw paper while no more could be fed past rollers 35, 36) were the following corrective measure not taken. The forward edge of the copy paper, when it is first fed over rotary knife 38, continues to move upward until it strikes the underside of deflector 66 (FIG. 1). The paper then moves under the deflector toward rollers 39, 40, but the paper bears against the underside of deflector 66, not the upper surface of knife 38. Deflector 66 thus serves as a "loop former," establishing some slack in the copy paper between rollers 35, 36 and 39, 40. When rollers 35, 36 stop turning, rollers 39, 40, which continue to rotate, take up the slack. The knife finishes its cut before most of the slack is taken up.

With the release of relay K1 and the opening of contact K1-E, timing motor TM3 also deenergizes. Cam 96 is connected by spring 100 to stop 99. Pin 101 is included on the underside of the cam. As soon as TM3 deenergizes, the spring causes cam 96 to restore in the counterclockwise direction with the cam stopping when pin 101 hits stop 99. Camming surface 98 once again opens switch SW-L. The energizing circuit for knife solenoid K-10 is broken and knife 38 restores.

In the event the original is greater than 20 inches, camming surface 98 opens switch SW-J after 20 inches of copy paper have been fed from roll 33. The energizing circuit for relay K1 is broken, contact K1-D restores and the knife operates to cut off the maximum length of 20 inches from the copy paper roll. Cam 96 restores as though the trailing edge of the original had passed switch SW1.

As the original continues to be transported toward the scanning window the leading edge actuates switch SW2 (actually, this occurs before the trailing edge passes switch SW1 and the knife operates). The closing of the switch energizes relay K2. Contact K2-A closes to provide an alternate path for the corona charging system through this contact and contact K4-F. Originally, the corona charging current flowed through contact K1-C. Even after relay K1 releases, however, the corona charging circuit remains energized as long as relay K2 is operated. This is necessary because were the corona charging system to deenergize with the release of relay K1, the trailing portion of the cut copy sheet would not be charged.

Although contact K2-C opens with the energization of relay K2, this has no effect on the running of timing motor TM1. The motor is held operated by the current flowing through normally closed switch SW-B and now transferred switch SW-A.

As the original passes the scanning window, the copy paper is exposed. As the original continues to be scanned the leading edge actuates switch SW3. Although relay K3 energizes, it has no effect during single copy mode operation. Similarly, its release at the end of the cycle has no effect.

As cam 95 continues to rotate eventually one of the camming lobes opens switch SW-B. (As shown in FIG. 4, it is lobe 95b which opens switch SW-B, although it is understood that a different lobe controls this operation during each cycle as the cam makes only one-third of a revolution during each copying operation.) With the opening of switch SW-B timing motor TM1 stops operating. Cam 95 remains parked with switches SW-E and SW-F still closed, thus keeping the two exposure lamps on.

When the trailing edge of the original passes switch SW2, relay K2 deenergizes. With the opening of contact K2-A the corona charging circuit deenergizes. (Contact K1-C is by this time open since relay K1 releases before relay K2.) Since the trailing edge of the copy paper is now clear of the corona unit further charging is unnecessary. With the release of relay K2, contact K2-C closes. Since contact K5-A is always closed during the single copy mode, and contact K1-A restored to its closed position with the release of relay K1, timing motor TM1 resumes operating even though switch SW-B is still open. Cam 95 thus resumes its rotation in the counterclockwise direction. Switches SW-E and SW-F are still closed, however, because it is necessary to keep the exposure lamps energized until after the exposure process has been completed.

As soon as cam 95 rotates slightly further in the counterclockwise direction, switch SW-B closes once again to provide an alternate current circuit for timing motor TM1. After cam 95 has rotated one-third of a revolution, with the lobes being in the positions shown in FIG. 4 (although each has moved 120°), switch SW-A reverses and assumes the position shown in FIG. 3. At this time the timing motor turns off because contacts K1-C and K2-A are open. Although cam 95 starts turning from its parked position when the trailing edge of the original passes switch SW2 at the forward end of the scanning window, by the time cam 95 has rotated from the parked position through the end of its one-third revolution the original has been completely transported past the scanning window and the copy sheet has completely passed by the copy exposure window. With cam 95 in its initial position (although rotated 120°), switches SW-E and SW-F open and the two exposure lamps turn off.

It should be noted that timing motor TM1 stops operating and cam 95 is parked when switch SW-B is opened. The operation of the timing motor and the rotation of cam 95 resume when the trailing edge of the original passes switch SW2 and relay K2 releases. With a short original it is possible for relay K2 to release even before switch SW-B is opened. In such a case cam 95 is not parked. However, it requires 5 seconds for cam 95 to rotate 120° and the two exposure lamps thus remain on for at least 5 seconds during each copying cycle. (With an original shorter than the distance between rollers 9 and 8, the original becomes trapped between the rollers and it is necessary to lift the bridge in order to remove the document. Switch SW2 does not operate and a maximum length copy sheet is cut. Since the original does not pass the scanning window the copy sheet is not exposed and is transported out of the machine with no image on it.)

The original and the copy are deposited in their respective trays as they are passed through the machine. At the end of the process all switches and relays are in the conditions shown in FIGS. 3 and 4, with the exception of cam 95 which has rotated 120°. However, since the cam has three symmetrically positioned lobes, as far as the machine operation is concerned the cam is in its initial position.

DETAILED DESCRIPTION OF VAN AUKEN et al.
MULTIPLE COPY OPERATION (FIGS. 1-6)

The number of copies produced is selected by the operator. The outer edge of the multiple copy selector dial 107 (FIG. 5) is sequentially numbered in 16 equal graduations, starting with "1" and progressing in the counterclockwise direction up to "16." The normal or single copy mode position of the multiple copy selector dial is that in which the numerically designated position of "1" is as shown in FIG. 5. If the dial is in the normal position the machine operates in the single copy mode. To select any other number of copies, the dial is turned until the desired number is in the "12 o'clock" position. The dial can be rotated or changed at any time during the copying cycle.

During each reverse travel of the original, the dial is rotated one position in the counterclockwise direction by timing motor TM2. This "counting down" or decrementing of the selector dial provides a visual indication of the number of copies which must yet be made. If the selector is not changed by the operator, the decrementing continues until the dial is in the single copy mode position of FIG. 5. At this time, the original is scanned for the last time after which it is deposited in the original receiving tray just as it is during the single copy mode.

In the multiple copy mode, the functional sequence is the same as that of the single copy mode except that when the leading edge of the original actuates switch SW3 during the first scan cycle, a series of control circuits are activated. These control circuits reverse the normal travel of the original transport system when the trailing edge of the original clears switch SW3. The original is reversed at high speed. The control circuits also prevent the machine from making a copy while the original is being reversed.

When the leading edge of the original clears switch SW2 during high-speed reverse, the transport system is again normalized so that the original is transported in the forward direction to be scanned once again. This action is repeated until the multiple copy selector dial is decremented to the "1" position at which time the last scan begins with the machine operating in the single copy mode. The multiple copy selector dial has two camming surfaces 102 and 103. Camming surface 102 has 16 detent positions equally spaced around the circumference of the cam. The actuating arm for switch SW-C rides on the camming surface. When the actuating arm is on a high portion of the camming surface (between detents) switch SW-C is closed. Each time camming surface 102 is rotated the switch actuating arm drops into a detent and switch SW-C opens. When the timing motor TM2 is first energized camming surface 102 starts to rotate in the counterclockwise direction. The actuating arm of switch SW-C moves to a high point on camming surface 102 to close the switch. The control circuit that initially starts the timing motor rotation is deenergized soon after the timing motor starts to operate, but if it is energized long enough the "lock circuit" established by the closing of switch SW-C insures the continued timing motor operation until the actuating arm drops into the next detent of camming surface 102. At this time, timing motor TM2 stops operating.

Camming surface 103 has only one detent. The detent is located at a position such that it will permit the actuating arm of switch SW-D which rides on the camming surface to be in the detent only when the multiple copy selector dial is in the single copy mode position. When the actuating arm is in the detent the switch is open. It is switch SW-D which controls the multiple copy mode sequencing circuits. When the selector dial is manually rotated to a position representing the number of copies desired, both surfaces of cams 102 and 103 are rotated. With switch SW-D closed the multiple copying operation ensues. But as the selector dial is decremented, switch SW-D opens when the numeral "1" on the dial is in the "12 o'clock" position. After the original is reverse transported or the last time, the last of the required number of copies is made in the same way that a single copy is made.

Up to the point when switch SW3 is first energized by the lading edge of the original the operation in the multiple copy mode is the same as that in the single copy mode. With the energization of switch SW3 and the operation of relay K3, contact K3-D closes to energize relay K5. Current flows through contact K3-D, the relay coil, and switch SW-D, switch SW-D being closed by camming surface 103 when more than one copy is being made.

When contact K5-C closes current flows through the energizing coil of clutch timer K-9. The operation of this clutch couples cam 104 (FIG. 6) to drive chain 75 (FIG. 2). Cam 104 thus rotates in the forward (counterclockwise) direction as shown in FIG. 6. (Gearing, not shown, is provided to gear down the speed of cam 104 with respect to the drive chain speed. Cam 104 makes less than a single revolution even for the maximum length original.) Switch SW-Q is normally closed. As cam 104 continues to rotate in the forward direction, switch SW-Q opens in the energizing circuit for relay K1. However, relay K1 remains energized. Although after 8 inches of copy paper have been fed into the machine switch SW-H is opened by camming surface 97 on cam 96, relay K1 remains energized by the current flowing through contact K1-B, diode CR-12, switch SW1, contact K4-D and switch SW-J.

When relay K5 first energizes, contact K5-A opens. It will be recalled that in the single copy mode timing motor TM1 first operates when relay K1 is energized and contact K1-C closes. The timing motor continues to operate until switch SW-B opens at which time the timing motor is parked. When relay K2 releases and contact K2-C closes (contact K1-A having closed earlier), the timing motor continues to operate until cam 95 has turned through its one-third revolution. However, with relay K5 operated and contact K5-A open in the multiple copy mode, the timing motor cannot resume operating when relay K2 releases and contact K2-C closes. Consequently, the timing motor remains parked throughout the multiple copy mode. Switches SW-E and SW-F remain closed and the two exposure lamps remain operated throughout the multiple copy cycle. It is only when the last copy is being made and relay K5 is released because switch SW-D is open that the last release of relay K2 allows timing motor TM1 to resume operation. Thus, even in the multiple copy mode cam 95 turns through only 120° during the entire cycle.

With the leading edge of the original at photocell 15, relays K1, K2, K3 and K5 are energized, the corona circuit is still energized through contact K1-C, and through the alternate circuit including contact K2-A and K4-F, and the copY paper roll clutch K-6 is still energized through the K1-D transfer contact. The exposure lamp timing motor TM1 becomes parked as soon as cam 95 has rotated a sufficient amount to open switch SW-B. Copy paper knife timing motor TM3 is still operating since contact K1-E is closed. Switch SW-N is open and switch SW-L is closed. Assuming that the length of the original is greater than 8 inches, switch SW-H is open. Cam 104 continues to rotate in the forward direction.

The scanning and exposure process continues until the trailing edge of the original clears switch SW1 and relay K1 deenergizes. When contact K1-D restores to the position shown in FIG. 3, copy paper roller clutch K-6 deenergizes to stop the copy paper feed. At the same time knife solenoid K-10 operates to cut the copy paper to the length of the original. Since contact K1-E is now open, timing motor TM3 stops operating and spring 100 returns cam 96 to the initial position. When switch SW-L opens, knife solenoid K-10 releases. (Again, if the length of the original is greater than 20 inches, camming surface 98 on cam 96 operates switch SW-J thereby releasing relay K1 so that knife solenoid K-10 operates to cut off a 20-inch length of copy paper.)

With short originals, relay K1 releases before relay K5 operates since the trailing edge of the original passes photocell 13 before the leading edge reaches photocell 15. The operation is the same, however, except that relay K1 does not deenergize until switch SW-H opens after a minimum length of 8 inches has been fed from the copy paper roll.

Although relay K1 is deenergized and contact K1-C is open, contact K2-A and K4-F are still closed so that the corona charging system is still energized. Eventually the trailing edge of the original passes switch SW2 permitting relay K2 to deenergize. With the opening of contact K2-A the corona system is deenergized. Originally, relay K5 was energized by the current flowing through contact K3-D. As will be seen below, relay K3 soon releases. However, with relay K2 deenergized, contact K2-B is in the position shown in FIG. 3 and relay K5 is held energized by current flowing through contact K2-B and contact K5-B. Although contact K2-C closes with the release of relay K2 (which causes timing motor TM1 to resume operation in the single copy mode), because relay K5 is energized and contact K5-A is open, timing motor TM1 remains deenergized in the multiple copy mode.

The trailing edge of the original clears the scanning window glass at the same instant that the trailing edge of the copy paper clears the exposure window opening. The scanning and exposure process is now complete and the copy sheet is being developed. The copy sheet is then deposited in the copy receiving tray. When the trailing edge of the original clears switch SW3, relay K3 is deenergized. While relay K3 was energized, contact K3-C was in its rightmost position. Since contact K4-B was open relay K4 could not operate. However, when contact K3-C restores to its normal position relay K4 operates since at this time contact K5-D is closed. With the energization of relay K4 a number of operations take place.

In the single copy mode, forward clutch K-7 is operated by current flowing through contact K4-C to control the forward feed of the original. Similarly, in the multiple copy mode relay K4 is initially deenergized and the original is fed in the forward direction with the energization of clutch K-7. But as soon as relay K4 energizes contact K4-C moves to its rightmost position in FIG. 3 to deenergize clutch K-7 and to energize clutch K-8. At this time the original is fed in the reverse direction through the machine. As described above in connection with FIG. 2, the reverse feed is faster than the forward feed.

Originally, contacts K4-A and K3-A, and switch SW-C were open so that timing motor TM2 could not operate. As soon as the trailing edge of the original passes switch SW3, relay K3 releases and contact K3-A closes. Since relay K4 operates at the same time and contact K4-A closes, current flows through this contact and contact K3-A to timing motor TM2. The timing motor thus starts to turn the multiple copy selector dial in the counterclockwise direction. But the original immediately starts its reverse feed through the machine, relay K3 is immediately reenergized and contact K3-A opens. By this time cam 107 has not rotated sufficiently such that the actuating arm of switch SW-C is on a high portion of camming surface 102. The detents on cam 102 are sufficiently wide to prevent closing of switch SD-C during the short interval that relay K3 is released. With switch SW-C still open when relay K3 reenergizes, timing motor TM2 stops operating. The dial is not decremented at this time.

The first photocell to become deenergized during the reverse feed is photocell 15 and relay K3 thus energizes. Relay K4 was first operated when relay K3 released and contact K3-C restored to the initial position shown in FIG. 3. Although contact K3-C now moves to its rightmost position, relay K4 remains energized by the current flowing through contact K3-C and contact K4-B. In order that contact K4-B not open during the switching of contact K3-C, relay K4 is prevented from releasing by current flowing through capacitor 110, this current continuing to flow until contact K3-C restores. Relay K5 was originally operated with the energization of relay K3 and the closing of contact K3-D. Subsequently, the relay was alternately energized with the release of relay K2 and the restoring of contact K2-B to the position shown in FIG. 3. At the end of the forward feed, contact K3-D opened with the release of relay K3 but the alternate energizing path held relay K5 operated. With the closing of contact K3-D at the start of the reverse feed, relay K5 is held on by currents through both paths.

The original continues to travel in its reverse direction. With relay K1 deenergized and contact K1-D in its normal position, clutch K-6 is not operated and there is no copy paper feed. Relay K5 is still energized and contact K5-C is still closed, timer clutch K-9 is still operated and cam 104 is still coupled to drive chain 75. But since the drive chain is now moving in the reverse direction, cam 104 moves in its reverse direction (clockwise). The cam, which at the end of the forward feed is in a position such as that shown by the numeral 106 in FIG. 6 (the exact position depends on the length of the original), starts moving toward it original position adjacent stop 105.

The original continues to be reverse transported and cam 104 continues to be restored. The trailing edge of the original actuates switch SW2 which results in the energization of relay K2. Although transfer contact K2–B switches position, relay K5 is held operated through contact K3–D. Relay K4 is now held operated through its own contact K4–B, and both contacts K3–C and K2–B. The trailing edge of the original then actuates switch SW1. This has no effect on relay K1, however, since switch SW–Q is open, and because relay K4 is energized contact K4–D is open as well. (It should be noted that switch SW1 is bypassed anyway by closed contact K4–E, which condition similarly cannot control the energization of relay K1.) Eventually, cam 104 restores sufficiently to close switch SW–Q. Current flows through switch sW–N, contact K4–E and switch SW1 in parallel, switches SW–Q and SW–J, and the relay coil. With a short original the trailing edge may not control the closing of switch SW1 by the time switch SW–Q closes. Bypassing contact K4–E is provided for this purpose— relay K1 energizes with the closing of switch SW–Q even if switch SW1 has not yet closed. This is necessary because relay K1 must operate to start the forward feed when switch SW–Q closes for there to be proper registration at the start of the next forward feed.

The actual time that relay K1 energizes as a result of the closing of switch sW–Q is variable, dependent upon the length of the original. As described above, timer clutch K–9 is energized with the closing of contact K5–C. This contact closes only when relay K5 energizes as a result of the closing of contact K3–D, which contact closes with the energization of relay K3 when the leading edge of the original actuates switch SW3. At the time drive chain 75 moving in the forward direction rotates cam 104 in the forward direction. When the trailing edge of the original clears switch SW3, the rollers in the original transport system are reversed. The timer clutch K–9 is still energized and consequently cam 104 is driven in the reverse direction. Although the drive chain moves at a faster speed in the reverse direction, the important criterion is the distance it moves. This distance is represented by the distance previously moved through by cam 104.

Since cam 104 first started to move when the leading edge of the original passed switch SW3, it would appear that switch SW–Q closes and relay K1 energizes only when the leading edge of the original is reverse transported past switch SW3. However, this is not the case. The camming surface of cam 104 is curved as shown in FIG. 6. Section 104a of the camming surface actuates switch SW–Q during the reverse movement of cam 104 even before the cam is fully restored to its initial position. Consequently, relay K1 is energized and the copy feed begins even before the leading edge of the original is adjacent switch SW3. The forward feed rate of the copy paper and the reverse speed rate of the original, as well as the shape of cam 104, are such that the leading edge of the original reaches switch SW2 at the same time that the copy paper has been fed into the machine an amount such that its forward edge reaches the copy exposure window. The fact that switch SW–Q closes even before cam 104 has completely restored allows the copy paper feed to begin even before the leading edge of the original has been completely drawn back into the machine. This allows for maximum copying speed since by the time the leading edge of the original has cleared the scanning window and is adjacent switch SW2, the leading edge of the copy paper is adjacent the exposure window and the forward feed of the original can start immediately. The original need be reverse transported the minimum distance, i.e., only until its leading edge just clears the scanning window.

With the closing of switch SW–Q and the energization of relay K1, the corona circuit is once again operated through contact K1–C. Copy paper roller clutch K–6 is also energized as a result of contact K1–D moving the right. Similarly, knife timing motor TM3 starts operating with the closing of contact K1–E. It is thus seen that with the closing of switch SW–Q, the copy feed cycle begins. While in the single copy mode the copy feed begins when the leading edge of the original actuates switch SW1, such is not the case in the multiple copy mode. In the multiple copy mode the copy feed starts when auxiliary feed switch SW–Q closes.

Eventually the trailing edge of the original actuates switch SW1 which provides an alternate current path around contact K4–E. Consequently, ever after relay K4 deenergizes, relay K1 remains operated.

When the leading edge of the original clears switch SW3, relay K3 deenergizes. With the opening of contact K3–D, relay K5 deenergizes. This in turn opens contact K5–C to release timer clutch K–9. By this time cam 104 is in its initial position since the leading edge of the original is adjacent switch SW3. Although contact K3–C restores, relay K2 is still energized and relay K4 remains energized by the current through contacts K2–B and K4–B.

With relay K3 released and relays K2 and K4 operated, timing motor TM2 starts operating once again. This time, however, relay K3 does not immediately reenergize and cam 102 moves sufficiently to close contact SW–C. Contact SW–C is closed before relay K2 releases as the leading edge of the original clears switch SW2. The closed contact keeps timing motor TM2 energized until the dial is decremented one position and the contact opens.

The original continues to move in the reverse direction until the leading edge clears switch SW2. Relay K2 deenergizes and with the restoring of contact K2–B relay K4 deenergizes. When contact K4–C restores, reverse clutch K–8 is deenergized and forward clutch K–7 energizes. Thus, the leading edge of the original, which has just cleared the original scanning window and the adjacent switch SW2, starts moving in the forward direction. Since at this time the leading edge of the copy paper is adjacent the forward end of the copy exposure window, perfect registration of the original and copy sheet is assured.

At this point in the operation relays K1 and K2 are energized, and relays K3, K4 and K5 are deenergized. As soon as relay K1 releases when the trailing edge of the original passes switch SW1, the copy paper roll feed stops and knife solenoid K–10 is actuated. The remainder of the cycle is the same as the first cycle. Similarly, subsequent cycles are identical to the second cycle. The multiple copy selector dial is decremented following each copy cycle. Eventually, the multiple copy selector dial is restored to the single copy position. Since switch SW–D is then open (following the completion of the next-to-last copy cycle) and relays K4 and K5 cannot operate, the last copy cycle is the same as that in the single copy mode, except for the fact that the copy paper feed has already started during the last reverse travel of the original.

It is thus seen that multiple copies can be made very fast. Not only is the original moved back through the machine at an increased speed, but the copy paper feed starts even before the original has completely cleared the scanning window. The leading edge of the original is not restored all the way to switch SW1. Instead, it is restored only to the front edge of the scanning window. By providing clutched cam 104, the leading edge of the copy paper reaches the copy exposure window just when the leading edge of the original reaches switch SW2 at which time forward feed of the original begins. The use of cam 104 allows the copy paper feed to begin even though the leading edge of the original is still out of the machine. The machine need not detect the leading edge of the original as it is withdrawn into the machine in order to start the copy paper feed because the position of cam 104 in effect represents the position of the leading edge of the original.

CHANGES MADE IN THE MACHINE OF FIGS. 1–6 TO OBTAIN REDUCED-SIZE COPYING CAPABILITY

FIGS. 1A–6A depict the illustrative embodiment of our invention. FIGS. 5A and 6A are identical to FIGS. 5 and 6. There are minor differences between FIGS. 1A–4A and respective FIGS. 1–4, as follows:

FIG. 1 —Lens 28 is positioned closer to the exposure window, and has a shorter focal length than the corresponding lens in FIG. 1.

FIG. 2A—sprocket 79 on FIG. 2A has a smaller diameter than sprocket 79 on FIG. 2; sprocket 76 on FIG. 2A has a slightly larger diameter (shown exaggerated) than sprocket 76 on FIG. 2.

FIG. 3A—Contact SW–J is no longer included in series with the winding of relay K1 as in FIG. 3; instead, it is placed in series with the winding of forward clutch K7.

FIG. 4A—Switch SW–J has a shorter finger than switch SW–J in FIG. 4. Lower camming surface 97 is provided with an additional lobe 97a, and switch SW–J is mounted adjacent to the lower cam level rather than the upper one so that it opens when lobe 97a strikes the switch finger.

DESCRIPTION OF OPERATION OF SYSTEM OF FIGS. 1A–6A

The use of a shorter focal length lens 28, placed closer to the exposure window, results in the formation of a reduced-size image at the exposure window. In the illustrative embodiment of the invention the image is only 75 percent of the size of the original document to be copied. In order for the reduced-size image to be copied, however, it is necessary that the copy paper move at the speed of the image. In the Van Auken et al. machine, the copy sheet moves at the same speed as the original in the forward direction. To properly expose the copy sheet in accordance with the reduced-size image, it is necessary for the copy sheet to move slower relative to the original. This can be accomplished either by speeding up the original or slowing down the copy sheet. In the illustrative embodiment of the invention, it is achieved by speeding up the original. The diameter of sprocket 79 in FIG. 2A is only 75 percent as large as the diameter of sprocket 79 in FIG. 2. Consequently, when forward clutch K–7 operates, the ratio of the speed of the original document to the speed of the copy sheet is 4:3. The relative speeds are such that the reduced-size image is properly recorded on the copy sheet.

However, it is still necessary that the original document reach the scanning window at the same time that the copy sheet reaches the exposure window. Since the original document is speeded up, it is apparent that without any other modifications it would reach the scanning window before the copy sheet reaches the exposure window. For this reason, contact SW–J is placed in series with the winding of clutch K–7 on FIG. 3A. As cam 96 rotates, lobe 97a opens switch SW–J. The switch is opened some time prior to the original document reaching the scanning window. While switch SW–J is open, clutch K–7 is released so the forward feed of the original document ceases. As cam 96 continues to turn, switch SW–J closes and the forward feed of the original document resumes. Lobe 97a opens switch SW–J only long enough to make up for the increased speed of the original document.

It should be noted that switch SW–J is no longer placed in series with the winding of relay K1. The purpose of switch SW–J in the Van Auken et al. machine was to control the automatic cutting of a sheet from the copy paper roll after 20 inches of copy paper have been fed from the roll. With the omission of switch SW–J from the relay circuit, the copy sheet is no longer cut automatically in this manner. However, it has been found that original documents in excess of 20 inches in length are rarely fed into a copying machine, in which case there is no reason to automatically control the cutting of the copy sheet after 20 inches have been fed from the roll. Furthermore, if this feature is still desired, an additional switch can be used in the machine for this purpose, just as switch SW–J is used in the Van Auken et al. machine.

When multiple copies of an original are made, the original is halted during its first forward pass. Except for a relatively minor registration problem and its solution, to be described below, it is not necessary to change the sequence of the reverse movement of the original prior to the making of each additional copy. The copy paper feed in the machine of FIGS. 1A–6A is at the same speed as that in the machine of FIGS. 1–6. If the reverse speed of the original is the same as the reverse speed in the Van Auken et al. machine, it is apparent that the original in our machine will clear the scanning window during its reverse travel just when the copy sheet reaches the exposure window.

Moreover, during subsequent forward feeds of the original there is no need for momentarily halting the movement. The purpose of stopping the forward feed for some short interval during the first copy-making cycle is to make up for the increased speed of the original prior to its reaching the scanning window. But in subsequent cycles the original starts at the scanning window itself; the original is returned during the reverse movement only until its leading edge just clears the forward edge of the scanning window. All that is necessary at this point is for the original to move forward faster than the copy sheet.

Contact SW–J in FIG. 3A, in series with the winding of clutch K–7, still operates as cam 97 rotates. However, it will be recalled that relay K4 operates at the end of the first forward feed of the original; contact K4–C on FIG. 3 energizes reverse clutch K–8 rather than forward clutch K–7. During the reverse movement of the original, timing motor TM3 starts operating at the start of the copy feed cycle. As cam 97 rotates, lobe 97a opens switch SW–J during the copy paper feed. But switch SW–J opens while the original is still moving in the reverse direction. Consequently, referring to FIG. 3A, while switch SW–J does open during each additional copy sheet feed, it does so at a time when contact K4–C controls the energization of reverse clutch K–8 rather than forward clutch K–7. Thus contact SW–J has no effect on movement of the original after the first copy is made. This is the required operation inasmuch as, at the start of each forward feed of the original after the first, the original and the copy sheet are both at the front edges of their respective windows and there is no need to interrupt movement of the original in order to allow the copy sheet to catch up to it.

In the analysis of the operation of the Van Auken et al. machine, the original and copy sheets were described as reaching their respective windows at the same time. At the same time that the original is illuminated and light reflected from it is directed to the exposure window, the copy sheet enters the exposure window and is exposed by the reflected light. Our machine has been described thus far in the same frame of reference. But a more critical analysis is required. This analysis will consider scanning and exposure windows of widely varying dimensions and will more accurately determine for how long lobe 97a must keep switch SW–J open. Also, the analysis will show that for perfect registration of the original and the copy sheet in the multiple copy mode, the reverse speed in our machine must be slightly slower than the reverse speed in the Van Auken et al. machine.

During the scanning process (the process by which a latent image is formed on the copy sheet), any given point on the copy paper must remain "locked in" to a particular point on the original. Otherwise, each point on the copy sheet will be exposed by light reflected from more than one corresponding point on the original. The corresponding point of the image for each object point is determined by the intersection of the image focal plane with a line from the object point drawn through the nodal points of the lens. (The nodal points of the lens are points on the lens axis such that an incident ray passing through the first nodal point at a particular angle to the axis leaves the second nodal point at the same angle to the axis.)

In a full-size copying machine, it follows that the leading edge of the copy sheet and the leading edge of the original must be intersected by a straight line through the lens nodal points at all times during scanning. This in turn requires that the distance of the leading edge of the copy sheet from the optical axis in the image plane (the intersection of the optical axis of the copying machine with the exposure window) be equal to the distance of the leading edge of the original from the optical axis in the object plane (the intersection of the optical axis of the machine with the scanning window) at all times during scanning. This "optical synchronization" must be achieved by the time the scanning process begins. Once it is so achieved, it is maintained since the original and the copy sheet move at the same speed past their respective windows.

The optical synchronization described above must be distinguished from the lens angle over which scanning actually takes place. As long as optical synchronization exists, light may be reflected from the original and directed to the copy sheet; corresponding points on the original and copy sheet move in synchronism with each other. But it is not necessary that exposure take place at all times when there is optical synchronization. In fact, a mechanism is generally provided to adjust the time duration during which each point on the copy sheet is exposed so that the contrast of the finished copy can be varied.

The length of time that any particular point on the copy sheet is exposed can be varied in several ways. For example, consider a very long scanning window, a very long exposure window, and an optical system which is capable of gathering light over a large angle at the scanning window and directing it over the same large angle to the exposure window. If the scanning and exposure windows have the same length (and both are centered with respect to the optical axis of the machine) every point on the copy sheet will be exposed from the moment it enters the exposure window until the moment it leaves the exposure window. On the other hand, suppose that the scanning window is shortened while the exposure window remains the same length. This simply means that when each point of the copy sheet enters the exposure window, it is not exposed since the corresponding point on the original has no light reflected from it (it is not within the physical boundaries of the scanning window). There is still optical synchronization but because light from the corresponding point on the original is physically blocked by shortening the scanning window, the point on the copy sheet is not exposed. Similarly, as each point on the copy sheet moves through the last part of the exposure window, it is not exposed because the corresponding point on the original no longer reflects light since it is physically blocked by the shortened scanning window.

Similarly, the physical dimensions of the exposure window can be shortened to cut down the exposure time. It is not even necessary for the scanning and exposure windows to be symmetrical relative to the optical axis of the machine. All that is required is that the original and copy sheet be in optical synchronization for as long as the copy sheet is actually exposed.

In order to make a reduced-size copy, the lens is moved toward the exposure window. The lens nodal points in such a case are no longer centered between the two focal planes. Instead, they are closer to the image plane. If the image reduction is 4:3, it means that the ratio of the distance between each point in the object plane and the optical axis to the distance between the corresponding point in the image plane and the optical axis is 4:3. There still must be optical synchronization in that each point in the image must be exposed to light from only a single corresponding point in the object. Since the distance ratio is always 4:3, it is apparent that for there to be optical synchronization the ratio of the original speed to the copy sheet speed must be 4:3.

This speed ratio must be exhibited only during the actual scanning. Until each point on the copy sheet actually starts to be exposed, it does not matter whether it is in optical synchronization with its corresponding point on the object. Thus, starting only when the leading edge of the copy sheet is first exposed must the ratio of the distance between the leading edge of the original and the optical axis (in the scanning window) to the distance between the leading edge of the copy sheet and the optical axis (in the exposure window) be 4:3.

With this background, the timing requirements for optical synchronization in the machine of our invention can be analyzed in greater detail. The leading edge of the copy sheet is first exposed at some distance in front of the optical axis within the exposure window. This distance is fixed in the illustrative embodiment of the invention since the shutter affects only the rear edge of the window (see FIGS. 1 and 1A). In those machines provided with shutter blades at both ends of the window, the leading edge of the copy sheet is first exposed at a point in front of the optical axis determined by the exposure setting. Optical synchronization must be achieved in all cases, and thus it must be achieved before the leading edge of the copy sheet is exposed even with the greatest possible exposure window shutter opening. As a practical matter, the length of the scanning window is short enough such that the optical system is capable of exposing all points on the copy sheet corresponding to all points within the physical boundaries of the scanning window on top of the machine (provided the physical dimensions of the exposure window allow this extensive an exposure). This means that for optical synchronization in all cases, all that is required is that when the original just reaches the scanning window (exposure cannot possibly begin before this time) and is a distance X inches away from the optical axis intersection with the scanning window, the leading edge of the copy sheet must be 3X/4 inches away from the optical axis intersection with the exposure window. Thereafter, the original and the copy sheet must move at speeds having a ratio of 4:3.

Thus, regardless of the physical dimensions of the scanning and exposure windows, optical synchronization is assured if the original during its first forward movement is delayed sufficiently by lobe 97a to allow the copy sheet to reach a point in front of the optical axis which is three-quarters of the distance between the forward edge of the scanning window and the optical axis at the same time that the original just reaches the scanning window.

The Van Auken et al. machine is designed to operate in the multiple copy mode by returning the original in the reverse direction past the scanning window and just when the leading edge clears the scanning window starting the forward movement again. If the distance between the forward edge of the scanning window and the optical axis is X inches, then by this time the copy sheet has advanced to a point within the exposure window which is also X inches in front of the optical axis. The leading edges of the original and copy sheet must be the same distances away from the optical axis within the respective windows for there to be optical synchronization in the case where full-size copies are made. But when a reduced size copy is to be made, as described above, the leading edge of the copy sheet must be closer to the optical axis by a ratio of 4:3 when optical synchronization is achieved. This means that the copy sheet must actually travel a little bit farther in the machine of our invention before forward movement of the original begins. This could be accomplished, for example, simply by returning the original in the reverse direction at the same speed as it is moved in the Van Auken et al. machine, and then waiting for a brief interval before actually moving the original in the forward direction once again. During this brief waiting interval, the copy sheet would advance the necessary X/4 inches. In the illustrative embodiment of our invention, what is done instead is simply to slow down the reverse speed of the original by a slight amount. It takes longer for the original to be returned in the reverse direction until its leading edge just clears the forward edge of the scanning window. By the time this does take place, the copy sheet has advanced the extra X/4 inches; thus, with the start of the forward feed of the original, there is the necessary optical synchronization. This is shown in FIG. 2A where sprocket 76 is shown larger than sprocket 76 in FIG. 2. With the larger sprocket 76, it is apparent that sprocket 77 in FIG. 2A moves slower than sprocket 77 in FIG. 2. This results in a slightly slower reverse speed for the original.

If the reverse speed is not slowed down in this manner, there will be imperfect registration. The copy sheet will be "lagging" the original by X/4 inches. This means that the first X/4 inches of the final copy will be missing (corresponding to the first X/3 inches of the original) because the image points corresponding to object points in the first X/3 inches of the original are at all times in front of the leading edge of the copy sheet. As a practical matter, the length of the scanning window in a typical machine might be only 1.2 inches and, if it is centered relative to the optical axis, X=0.6 inch. Thus only 0.2 inch of the original would be lost due to imperfect registration. But even this small loss can be prevented by lowering the reverse speed as described above.

Thus it is seen that for proper optical synchronization, lobe 97a must be large enough to interrupt the forward movement of the original such that by the time the leading edge of the original reaches the scanning window during the first copying cycle and is X inches in front of the optical axis, the copy sheet is 3X/4 inches in front of the optical axis within the exposure window. (It must be borne in mind that the only reason the controlling criterion is when the original reaches the forward edge of the scanning window is that exposure of the copy sheet cannot possibly take place before the original reaches the scanning window. Although exposure of the copy sheet need not begin immediately, and in fact will not begin immediately in the case of a small double-blade shutter opening, if optical synchronization is achieved by the time the than the the forward edge of the scanning window, then there is no question that optical synchronization will be achieved in every possible case.) The reduction in the reverse speed of the original is such document at the start of each forward movement of the original beginning with the second, the leading edge of the copy sheet is 3X/4 inches in front of the optical axis within the exposure window.

Although the invention has been described with reference to a particular embodiment, it is to be understood that this embodiment is merely illustrative of the application of the principles of the invention. Numerous modifications may be made therein and other arrangements may be devised without departing from the spirit and scope of the invention.

What we claim is:

1. A copying machine for making reduced-sized copies comprising a scanning window, roller means for engaging and transporting an original document to be copied in the forward direction past said scanning window, an exposure window, means for transporting copy paper past said exposure window at a speed less than the speed of said original document, means for scanning said original at said scanning window and for producing a reduced-size image thereof on said copy paper at said exposure window, means for momentarily interrupting movement of said original document prior to exposure of said copy paper such that said original document and said copy paper are placed in optical synchronization and means for controlling said roller means to return said original document in the reverse direction past said scanning window to permit another forward movement of said original document past said scanning window and another exposure of copy paper at said exposure window in response thereto.

2. A copying machine for making reduced-size copies in accordance with claim 1, wherein said roller means returns said original document past said scanning window in said reverse direction at a speed greater than the speed of said copy paper, and means for initiating the feed of said copy paper during movement of said original document in the reverse direction, said roller means moving said original document in the reverse direction at a speed and up to a point at which the forward feed of said original begins such that said original document and said copy paper are in optical synchronization during each forward movement of said original document after the first.

3. A copying machine for making reduced-size copies in accordance with claim 2 further including means for preventing said interrupting means from interrupting the forward movement of said original document during each forward movement after the first.

4. A copying machine for making reduced-size copies in accordance with claim 3 further including means in the forward path of movement of said original document for detecting the leading edge thereof and for initiating movement of said copy paper, said detecting means being positioned a distance in front of the intersection of the optical axis of the copying machine with said scanning window which is equal to the distance between the position of the leading edge of the copy paper at the start of the copy paper feed and the intersection of the optical axis of the copying machine with said exposure window.

5. A copying machine for making reduced-size copies in accordance with claim 1 further including means in the forward path of movement of said original document for detecting the leading edge thereof and for initiating movement of said copy paper, said detecting means being positioned a distance in front of the intersection of the optical axis of the copying machine with said scanning window which is equal to the distance between the position of the leading edge of the copy paper at the start of the copy paper feed and the intersection of the optical axis of the copying machine with said exposure window.

6. A copying machine for making reduced-size copies comprising a scanning window, means for transporting an original document to be copied in the forward direction past said scanning window, an exposure window, means for transporting copy paper past said exposure window at a speed less than the speed of said original document, means for scanning said original document at said scanning window and for producing a reduced-size image thereof on said copy paper at said exposure window, and means for momentarily interrupting movement of said original document prior to exposure of said copy paper such that said original document and said copy paper are placed in optical synchronization.

7. A copying machine for making reduced-sized copies in accordance with claim 6 further including means for controlling said original document transporting means to return said original document in the reverse direction past said scanning window to permit another forward movement of said original document past said scanning window and another exposure of copy paper at said exposure window in response thereto, said original document transporting means returning said original document past said scanning window in said reverse direction at a speed greater than the speed of said copy paper, and means for initiating the feed of said copy paper during movement of said original document in the reverse direction, said original document transporting means moving said original document in the reverse direction at a speed and up to a point at which the forward feed of said original document begins such that said original document and said copy paper are in optical synchronization during each forward movement of said original document after the first.

8. A copying machine for making reduced-size copies in accordance with claim 7 further including means for preventing said interrupting means from interrupting the forward movement of said original document during each forward movement after the first.

9. A copying machine for making reduced-size copies in accordance with claim 8 further including means in the forward path of movement of said original document for detecting the leading edge thereof and for initiating movement of said copy paper, said detecting means being positioned a distance in front of the intersection of the optical axis of the copying machine with said scanning window which is equal to the distance between the position of the leading edge of the copy paper at the start of the copy paper feed and the intersection of the optical axis of the copying machine with said exposure window.

10. A copying machine for making reduced-size copies in accordance with claim 6 further including means for controlling said original document transporting means to return said original document in the reverse direction past said scanning window to permit another forward movement of said original document past said scanning window and another exposure of copy paper at said exposure window in response thereto, and means for initiating the feed of said copy paper during movement of said original document in the reverse direction, said original document transporting means moving said original document in the reverse direction at a speed and up to a point at which the forward feed of said original document begins such that said original document and said copy paper are in optical synchronization during each forward movement of said original document after the first.

11. A copying machine for making reduced-size copies in accordance with claim 10 further including means for preventing said interrupting means from interrupting the forward movement of said original document during each forward movement after the first.

12. A copying machine for making reduced-size copies in accordance with claim 11 further including means in the forward path of movement of said original document for detecting the leading edge thereof and for initiating movement of said copy paper, said detecting means being positioned a distance in front of the intersection of the optical axis of the copying machine with said scanning window which is equal to the distance between the position of the leading edge of the copy paper at the start of the copy paper feed and the intersection of the optical axis of the copying machine with said exposure window.

13. A copying machine for making reduced-size copies in accordance with claim 10 further including means in the forward path of movement of said original document for detecting the leading edge thereof and for initiating movement of said copy paper, said detecting means being positioned a distance in front of the intersection of the optical axis of the copying machine with said scanning window which is equal to the distance between the position of the leading edge of the copy paper at the start of the copy paper feed and the intersection of the optical axis of the copying machine with said exposure window.

14. In a copying machine having transport means for moving an original document and transport means or moving a copy sheet past respective scanning and exposure windows, where the position of the leading edge of each copy sheet at the start of the feed thereof is a distance in front of the intersection of the optical axis of the copying machine with the exposure window which is equal to the distance between the position of the leading edge of the original document at the time when the copy sheet feed begins and the intersection of the optical axis of the copying machine with the scanning window, the improvement comprising means for moving said original document at a speed greater than the speed of said copy sheet, optical means for forming a reduced-size image of said original document on said copy sheet, and means for momentarily interrupting movement of said original document prior to exposure of said copy paper for a time interval sufficient to place said original document and said copy sheet in optical synchronization.

15. A copying machine in accordance with claim 14 further including means for controlling said original document transport means to return said original document in the reverse direction past said scanning window to permit another forward movement of said original document past said scanning window and another exposure of a copy sheet at said exposure window in response thereto, and means for initiating the feed of said copy sheet during movement of said original document in the reverse direction, said original document transport means moving said original document in the reverse direction at a speed and up to a point at which the forward feed of said original document begins such that said original document and a copy sheet are in optical synchronization during each forward movement of said original document after the first.

16. A copying machine in accordance with claim 15 further including means for preventing said interrupting means from interrupting the forward movement of said original document during each forward movement after the first.

* * * * *